H. E. FLAKE.
LINE HOLDER.
APPLICATION FILED NOV. 19, 1914.
1,146,240.
Patented July 13, 1915.
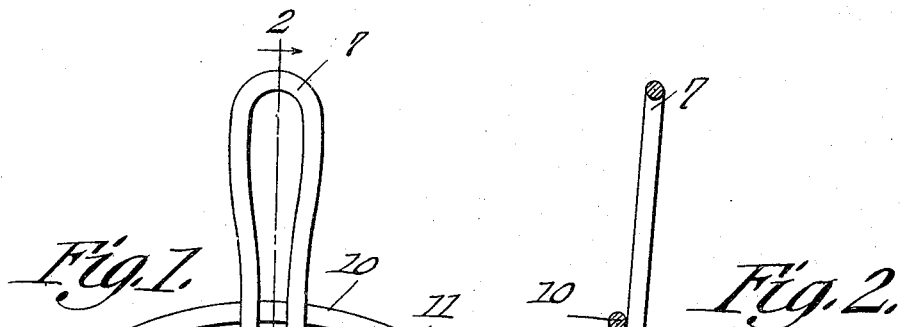
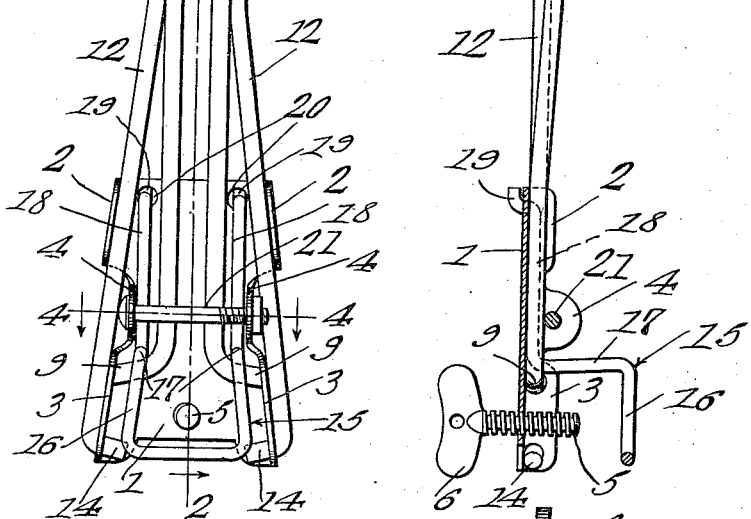
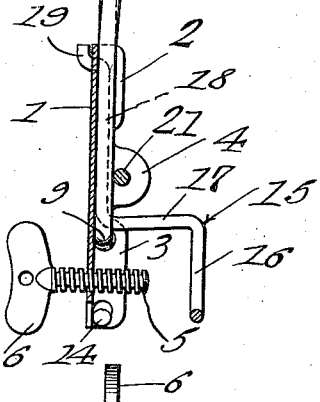
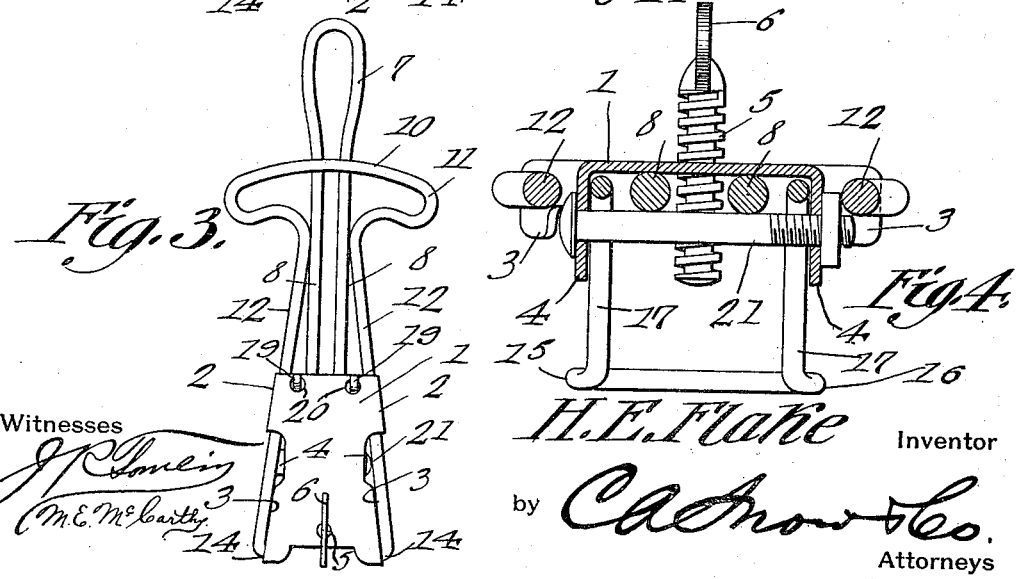
H. E. Flake, Inventor
Attorneys

UNITED STATES PATENT OFFICE.

HARLEY E. FLAKE, OF ATALISSA, IOWA.

LINE-HOLDER.

1,146,240.  Specification of Letters Patent.  Patented July 13, 1915.

Application filed November 19, 1914. Serial No. 873,049.

*To all whom it may concern:*

Be it known that I, HARLEY E. FLAKE, a citizen of the United States, residing at Atalissa, in the county of Muscatine and State of Iowa, have invented a new and useful Line-Holder, of which the following is a specification.

The device forming the subject matter of this application is a line holder adapted to be used upon a vehicle for the purpose of receiving the driving reins or lines.

The invention aims to provide a line holder of simple and merchantable form, the constituent elements of which may be assembled without the use of tools.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in rear elevation; Fig. 2 is a longitudinal section on the line 2—2 of Fig. 1; Fig. 3 is a front elevation; Fig. 4 is a cross section on the line 4—4 of Fig. 1.

The structure herein disclosed preferably is fashioned from metal throughout and embodies a support 1 in the form of a plate. Adjacent its upper end, presupposing that the device is used vertically, as shown in Fig. 1, the support is provided along its longitudinal edges with outstanding main ears 2. Adjacent its lower end, the support 1 is provided with outstanding auxiliary ears 3. Intermediate its ends, and between the ears 2—2 upon the one hand and 3—3 upon the other hand, the support 1 is provided along its longitudinal edges with supplemental ears 4. The longitudinal center of the support 1 is represented by the line 2—2 upon which the sectional Fig. 2 is taken. Having thus defined what is meant by the longitudinal center of the support 1, it will be observed that the main ears 2 converge upwardly toward the longitudinal center of the support, and the same is true of the auxiliary ears 3. The ears 3, however, lie nearer to the longitudinal center of the support 1 than do the ears 2, and the supplemental ears 4 are spaced inwardly from the auxiliary ears 3.

The invention includes an arched or U-shaped primary grip 7 comprising arms 8 terminated in laterally extended fingers 9 engaged detachably in openings in the auxiliary ears 3. A secondary grip 10 is shown, and this grip, like the grip 7 is of U or arched shape, considered broadly. The secondary grip 10 embodies a transverse head 11 and arms 12. The arms 12 pass inside of the main ears 2 in contact therewith, and lie outside of the auxiliary ears 3, in contact with the auxiliary ears, the arms 12 terminating in inwardly projecting fingers 14 mounted detachably in openings in the auxiliary ears. The arms 8 of the primary grip 7 lie between the arms 12 of the secondary grip 10 and the grip 7 is longer than the grip 10, so that the grip 7 bears against the terminal bend of the grip 10. The grips 7 and 10 are resilient and project in the same general direction.

The invention includes an arched or U-shaped bracket 15 which extends in a direction opposite to the grips 7 and 10. The bracket 15 embodies arms 18 which lie between the supplemental ears 4 and in contact therewith. The upper ends of the arms of the bracket 15 are reversely bent to form fingers 19 detachably engaged through openings 20 formed in the support 1 near the upper end thereof. The arms 18 of the bracket 15 are offset as shown at 17 for a double purpose: first, to permit them to clear the fingers 9 of the grip 7, and secondly, to provide a means which, bearing upon the upper edge of the dash board of a vehicle or the like, serves to uphold the support and the grips. The terminal bend of the U-shaped bracket 15 stands vertically as shown at 16 so as to coöperate with a screw 5, threaded into the support 1 and provided with a finger piece 6, the screw and the part 16 forming a clamp adapted to engage a dashboard or any other accessible part of a vehicle.

Mounted in the supplemental ears 4 is a securing element 21 which may be a bolt and nut structure. This securing element 21 extends transversely of the arms 18 of the bracket 15 and transversely of the arms 8 of the primary grip 7.

In assembling the constituent elements of the structure, the fingers 14 of the secondary grip 10 are inserted into the auxiliary ears 3 of the support 1 and the secondary grip is swung into parallelism with the support 1, the arms 12 of the grip 10 being compressed and being inserted between the main ears 2. The fingers 9 of the primary grip 7 are inserted into the ears 3 and the primary grip is swung upwardly into approximate parallelism with the support 1, until the arms 8 of the grip 7 bear against the bend of the grip 10, as clearly shown in Fig. 2. The fingers 19 of the bracket 15 are inserted through the openings 20 and the arms 18 of the bracket 15 are inserted between the supplemental ears 4. Then the securing element 21 is mounted in place in the supplemental ears 4. It is to be observed that the securing element 21 extends transversely of the arms 18 of the bracket 15 and thus the bracket is held in the support 1. The securing element 21 bears upon the arms 8 of the grip 7 and the grip 7 thus is held in place, the grip engaging the bend of the grip 10 and serving to hold the latter against displacement. If desired, and as clearly shown in Fig. 4, the arms 18 of the bracket 15 may be given a slight amount of play between the securing element 21 and the support 1, thus permitting the mounting of the device readily upon dash boards of different thicknesses. When the structure is in use, the screw 5 coöperates with the part 16 to support the entire structure.

Having thus described the invention, what is claimed is:—

1. In a line holder, a support; a grip and a bracket projecting in opposite directions and having offset fingers at their ends, the fingers being detachably engaged through openings in the support; a securing element on the support and extended across the grip and the bracket intermediate their ends; and a second grip on the support and coöperating with the first specified grip.

2. In a line holder, a support; a secondary grip one end of which is detachably engaged with the support; a primary grip one end of which is detachably engaged with the support, the primary grip engaging the secondary grip to hold the same on the support; a bracket projecting in an opposite direction to the grips and detachably engaged at one end with the support; and a securing element on the support and extended transversely of the bracket and the primary grip.

3. In a line holder, a support provided with main and auxiliary ears; an arched secondary grip comprising arms located between the main ears and upon the outside of the auxiliary ears, the arms terminating in fingers engaging the auxiliary ears; a primary grip extended across the bend of the secondary grip; and means for securing the primary grip to the support.

4. In a line holder, a support provided with main and auxiliary ears; an arched secondary grip comprising arms passing between the main ears and lying upon the outside of the auxiliary ears, the arms terminating in fingers engaging the auxiliary ears; an arched primary grip extended across the bend of the main grip and comprising arms terminated in fingers engaged with the auxiliary ears; and a securing element carried by the support and extended transversely of the primary grip intermediate the main and auxiliary ears.

5. In a line holder, a support provided adjacent its ends with main and auxiliary ears and provided with supplemental ears located between the main and auxiliary ears; a secondary grip comprising arms extended between the main ears and upon the outside of the auxiliary ears, the arms terminating in fingers mounted in the auxiliary ears; a primary grip extended across the free extremity of the secondary grip and comprising arms terminated in fingers received in the auxiliary ears; a bracket extended in a direction opposite to the grips and comprising arms lying between the supplemental ears, the arms being terminally mounted in the support adjacent the main ears; and a securing element mounted in the supplemental ears and extended across the arms of the bracket and across the arms of the primary grip.

In testimony that I claim the foregoing as my own, I have hereto affixed my signature in the presence of two witnesses.

HARLEY E. FLAKE.

Witnesses:
W. J. HARTMON,
H. J. ADY.